United States Patent
Oki et al.

(10) Patent No.: US 8,418,583 B2
(45) Date of Patent: Apr. 16, 2013

(54) BUSH BEARING AND RACK-AND-PINION TYPE STEERING APPARATUS FOR AUTOMOBILE USING THE SAME

(75) Inventors: Eiji Oki, Kanagawa (JP); Hidetoshi Kaida, Kanagawa (JP)

(73) Assignee: Oiles Corporation, Tokyo (JP)

( * ) Notice: Subject to any disclaimer, the term of this patent is extended or adjusted under 35 U.S.C. 154(b) by 254 days.

(21) Appl. No.: 12/935,147

(22) PCT Filed: Mar. 30, 2009

(86) PCT No.: PCT/JP2009/001466
§ 371 (c)(1),
(2), (4) Date: Sep. 28, 2010

(87) PCT Pub. No.: WO2009/122712
PCT Pub. Date: Oct. 8, 2009

(65) Prior Publication Data
US 2011/0016997 A1 Jan. 27, 2011

(30) Foreign Application Priority Data
Mar. 31, 2008 (JP) ................................. 2008-093691

(51) Int. Cl.
*F16H 1/04* (2006.01)
(52) U.S. Cl.
USPC .............................. 74/594; 384/276; 384/295
(58) Field of Classification Search ..................... 74/422, 74/594; 384/276, 295
See application file for complete search history.

(56) References Cited

U.S. PATENT DOCUMENTS

| | | | | | |
|---|---|---|---|---|---|
| 1,283,281 | A | * | 10/1918 | Palmer | 384/295 |
| 1,858,753 | A | * | 5/1932 | Taylor | 242/573.1 |
| 3,186,287 | A | * | 6/1965 | Wehlau | 84/251 |
| 3,383,142 | A | * | 5/1968 | Scott | 384/295 |
| 3,874,752 | A | * | 4/1975 | Imazaike | 384/296 |
| 4,513,990 | A | * | 4/1985 | Morita et al. | 280/124.169 |
| 4,553,856 | A | * | 11/1985 | Bierlein et al. | 384/276 |
| RE32,764 | E | * | 10/1988 | Smith et al. | 384/275 |

(Continued)

FOREIGN PATENT DOCUMENTS

| | | | | |
|---|---|---|---|---|
| JP | 01172620 | A | * | 7/1989 |
| JP | 04321813 | A | * | 11/1992 |
| JP | 07-190052 | | | 7/1995 |
| JP | 2007-040429 | | | 2/2007 |

OTHER PUBLICATIONS

International Search Report for PCT/JP2009/001466, mailed Jun. 23, 2009.

*Primary Examiner* — Troy Chambers
*Assistant Examiner* — Zakaria Elahmadi
(74) *Attorney, Agent, or Firm* — Nixon & Vanderhye P.C.

(57) ABSTRACT

A bush bearing 1 is comprised of: a synthetic resin-made bush 15 including a flexible semi-split cylindrical body 5 having an abutment portion 3 for slidably abutting against a rack shaft 25 and including a flexible open-ended annular body 14 which has a portion 6 formed integrally at one end face of the semi-split cylindrical body 5 and circular arc-shaped extended portions 12 and 13 whose distal ends 9 and 10 are opposed to each other with a clearance 11 in a circumferential direction R; and an elastic member 22 including an elastic body 21 for abutting against an outer surface 20 of the semi-split cylindrical body 5 and retained portions 16 and 17 which are respectively retained by both end portions 23 and 24.

9 Claims, 13 Drawing Sheets

U.S. PATENT DOCUMENTS

| | | | | |
|---|---|---|---|---|
| 4,800,057 A * | 1/1989 | Rabe | | 264/229 |
| 5,169,244 A * | 12/1992 | Siebert et al. | | 384/276 |
| 5,295,405 A * | 3/1994 | Gumbert et al. | | 74/99 R |
| 5,456,536 A * | 10/1995 | Holmes | | 384/420 |
| 5,601,370 A * | 2/1997 | Shibayama et al. | | 384/215 |
| 5,778,731 A | 7/1998 | Heep | | |
| 6,485,180 B2 * | 11/2002 | Mena | | 384/222 |
| 7,056,027 B2 * | 6/2006 | Puckett | | 384/276 |
| 7,686,515 B2 * | 3/2010 | Schust | | 384/220 |
| 7,798,504 B2 * | 9/2010 | Hirose et al. | | 280/93.514 |
| 7,815,204 B2 * | 10/2010 | Kaida et al. | | 280/93.514 |
| 7,954,396 B2 * | 6/2011 | Rombold et al. | | 74/422 |
| 2004/0057643 A1 * | 3/2004 | Blanchard et al. | | 384/276 |
| 2005/0058375 A1 * | 3/2005 | Ma | | 384/276 |
| 2007/0165973 A1 * | 7/2007 | Belpanno et al. | | 384/276 |
| 2009/0000853 A1 | 1/2009 | Hirose et al. | | |
| 2009/0020389 A1 * | 1/2009 | Ogata et al. | | 192/41 A |
| 2009/0226123 A1 * | 9/2009 | Klein | | 384/276 |
| 2010/0021095 A1 * | 1/2010 | Maier | | 384/220 |
| 2010/0239199 A1 * | 9/2010 | Nakagawa | | 384/283 |
| 2011/0103725 A1 * | 5/2011 | Omori | | 384/276 |
| 2012/0087608 A1 * | 4/2012 | Roessler | | 384/215 |
| 2012/0148179 A1 * | 6/2012 | Kondo et al. | | 384/286 |

\* cited by examiner

BUSH BEARING AND RACK-AND-PINION TYPE STEERING APPARATUS FOR AUTOMOBILE USING THE SAME

This application is the U.S. national phase of International Application No. PCT/JP2009/001466 filed 30 Mar. 2009, which designated the U.S. and claims priority to Japan Application No. 2008-093691 filed 31 Mar. 2008, the entire contents of each of which are hereby incorporated by reference.

TECHNICAL FIELD

The present invention relates to a bush bearing, and more particularly to a bush bearing which is suitably used to movably support a rack shaft in a rack-and-pinion type steering apparatus for an automobile and a rack-and-pinion type steering apparatus for an automobile using the same.

BACKGROUND ART

Patent document 1: JP-A-2007-009962

In Patent Document 1, for example, a bush bearing is proposed which is comprised of a synthetic resin-made cylindrical bush in which a plurality of slits extending in an axial direction of a rack shaft are formed and an endless annular elastic member consisting of such as an O-ring which is fitted to an outer peripheral surface of this cylindrical bush. Such a bush bearing supports the rack shaft movably with an interference, the rack shaft having rack teeth meshing with the teeth of a pinion gear.

DISCLOSURE OF THE INVENTION

Problems to be Solved by the Invention

Incidentally, in cases where the rack shaft which is guided in a predetermined direction by a rack guide has undergone random swinging motion on the basis of a bend in the rack shaft and the movement of the rack shaft and the pinion gear into close proximity to or away from each other, a large increase in the frictional resistance force of the rack shaft with respect to the rack guide can occur. Hence, there is a possibility that the smooth movement of the rack shaft in a predetermined direction can be hampered, possibly causing a decline in the steering feel of the rack-and-pinion type steering apparatus.

The present invention has been devised in view of the above-described aspects, and its object is to provide a bush bearing which is capable of smoothly moving the rack shaft in a predetermined direction without causing a large increase in the frictional resistance force of the rack shaft with respect to the rack guide due to the random swinging motion of the rack shaft, to thereby make it possible to prevent a decline in the steering feel of the rack-and-pinion type steering apparatus, as well as a rack-and-pinion type steering apparatus for an automobile using the same.

Means for Solving the Problems

A bush bearing in accordance with the present invention is comprised of: a synthetic resin-made bush including a flexible semi-split cylindrical body which is disposed on a side of a rack shaft-pinion gear spacing-apart direction, and which has on an inner surface thereof an abutment portion for slidably abutting against a rack shaft, and including a flexible open-ended annular body which has a portion formed integrally at one end face in an axial direction of the semi-split cylindrical body and a pair of extended portions which extend from both end portions in a circumferential direction of the portion and whose respective distal ends are opposed to each other with a clearance in the circumferential direction; and an elastic member including an elongated elastic body which has retained portions formed at both end portions thereof and abuts against an outer surface of the semi-split cylindrical body, the retained portions being respectively retained by both end portions in the circumferential direction of the semi-split cylindrical body.

According to the bush bearing in accordance with the present invention, the bush bearing is particularly comprised of: a synthetic resin-made bush including a flexible semi-split cylindrical body which is disposed on a side of a rack shaft-pinion gear spacing-apart direction, and which has on an inner surface thereof an abutment portion for slidably abutting against a rack shaft, and including a flexible open-ended annular body; and an elastic member including an elongated elastic body which has retained portions formed at both end portions thereof and abuts against an outer surface of the semi-split cylindrical body, the retained portions being respectively retained by both end portions in the circumferential direction of the semi-split cylindrical body. Therefore, in the case where the bush bearing is fitted in the housing, interferences of the semi-split cylindrical body with respect to the rack shaft are formed on the basis of the elasticity of the elastic member which is pressed by the housing, thereby making it possible to allow the portion of the rack shaft on the side of the rack shaft-pinion gear spacing-apart direction to be smoothly and slidably supported by the abutment portion of the semi-split cylindrical body. Hence, it is possible to smoothly move the rack shaft in a predetermined direction without causing a large increase in the frictional resistance force of the rack shaft with respect to the rack guide due to the random swinging motion of the rack shaft, thereby making it possible to prevent a decline in the steering feel of the rack-and-pinion type steering apparatus. In addition, according to the bush bearing in accordance with the present invention, particularly since the bush has the semi-split cylindrical body and the open-ended annular body, it is possible to effect manufacture with less material and attain a reduction in the manufacturing cost as compared to, for instance, the bush bearing having a cylindrical bush in Patent Document 1.

In a preferred example of the bush bearing in accordance with the present invention, the elastic member has another elastic body juxtaposed to the elastic body and retained portions which are respectively formed at both end portions thereof, and each of the retained portions formed at the both end portions of the elastic body is connected to each of the retained portions formed at the both end portions of the another elastic body. According to such a preferred example, the rack shaft can be suitably supported slidably by the abutment portion of the semi-split cylindrical body.

In another preferred example of the bush bearing in accordance with the present invention, the elastic body has enlarged-diameter portions located in respective vicinities of the retained portions. According to such a preferred example, it is possible to form interferences at the both end portions and their vicinities in the circumferential direction of the semi-split cylindrical body. Hence, it is possible to support the rack shaft in a direction intersecting the rack shaft-pinion gear spacing-apart direction. In addition, even in cases where the rack teeth of the rack shaft and the teeth of the pinion gear are formed by helical gears, it is possible to suitably restrict the swinging motion of the rack shaft, thereby making it possible to prevent an increase in the frictional resistance force between the rack shaft and the semi-split cylindrical body.

In still another preferred example of the bush bearing in accordance with the present invention, a fitting protruding portion is formed at each of the both end portions in the circumferential direction of the semi-split cylindrical body, and a fitting recessed portion which is fitted to the fitting protruding portion is formed at the retained portion, such that the elastic member is adapted to be mounted to the bush through the fitting between the fitting protruding portion and the fitting recessed portion. According to such a preferred example, the elastic member can be mounted to the semi-split cylindrical body more reliably, and particularly when the bush bearing is fitted in the housing, it is possible to more reliably eliminate the possibility of the elastic member coming off the semi-split cylindrical body.

In a further preferred example of the bush bearing in accordance with the present invention, a plurality of abutment portions are formed on the inner surface of the semi-split cylindrical body. According to such a preferred example, it is possible to partially form a clearance between the semi-split cylindrical body and the rack shaft. For example, as a clearance is formed between the semi-split cylindrical body and the rack shaft in the rack shaft-pinion gear spacing-apart direction, it is possible to prevent an increase in the frictional resistance force between the semi-split cylindrical body and the rack shaft based on the random swinging motion of the rack shaft, particularly its swinging motion in the rack shaft-pinion gear spacing-apart direction, thereby allowing the rack shaft to slide more smoothly in the predetermined direction.

In a still further preferred example of the bush bearing in accordance with the present invention, a projection for inhibiting the rotation of the bush with respect to a housing in which the bush is fitted is formed on an outer peripheral portion of the bush. In such a preferred example, the positioning of the bush bearing can be effected simply.

A rack-and-pinion type steering apparatus for an automobile in accordance with the present invention is comprised of: a pinion gear; a rack shaft which has rack teeth meshing with teeth of the pinion gear and which is guided and moved by the rack guide; a housing through which the rack shaft is passed; and the above bush bearing of the present invention which is fitted in the housing and movably supports the rack shaft with respect to the housing.

Advantages of the Invention

According to the present invention, it is possible to provide a bush bearing which is capable of smoothly moving the rack shaft in a predetermined direction without causing a large increase in the frictional resistance force of the rack shaft with respect to the rack guide due to the random swinging motion of the rack shaft, to thereby make it possible to prevent a decline in the steering feel of the rack-and-pinion type steering apparatus, as well as a rack-and-pinion type steering apparatus for an automobile using the same.

Figure 1:
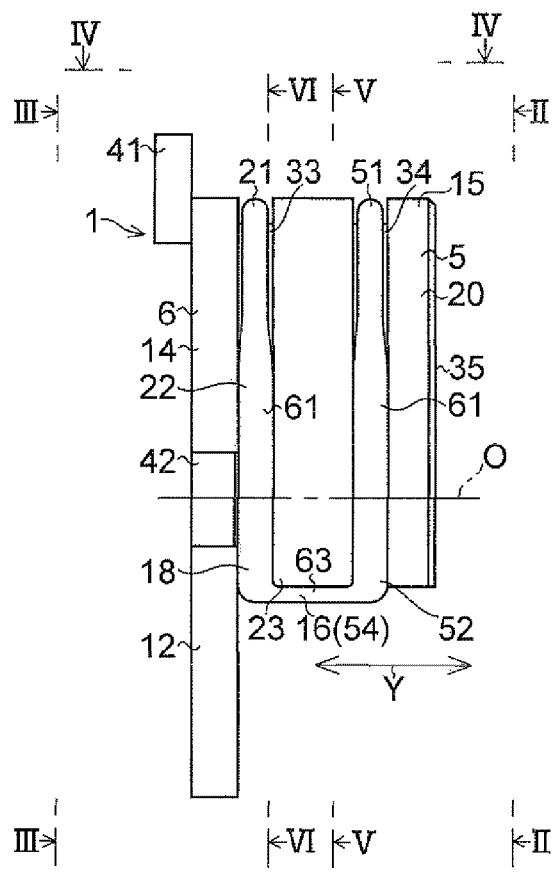
FIG. 1 is an explanatory side elevational view of an embodiment of the invention.
Figure 2:
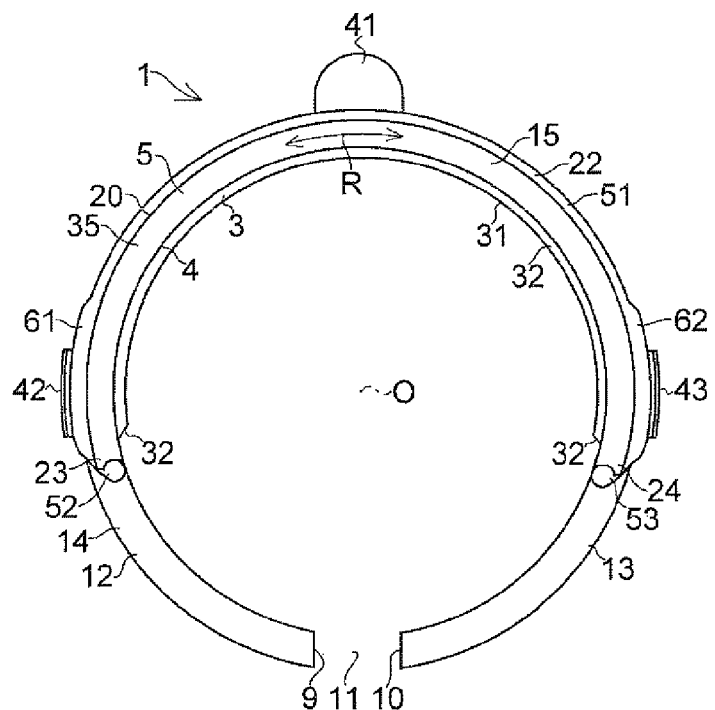
FIG. 2 is an explanatory view, taken in the direction of arrows along line II-II, of the embodiment shown in FIG. 1.
Figure 3:
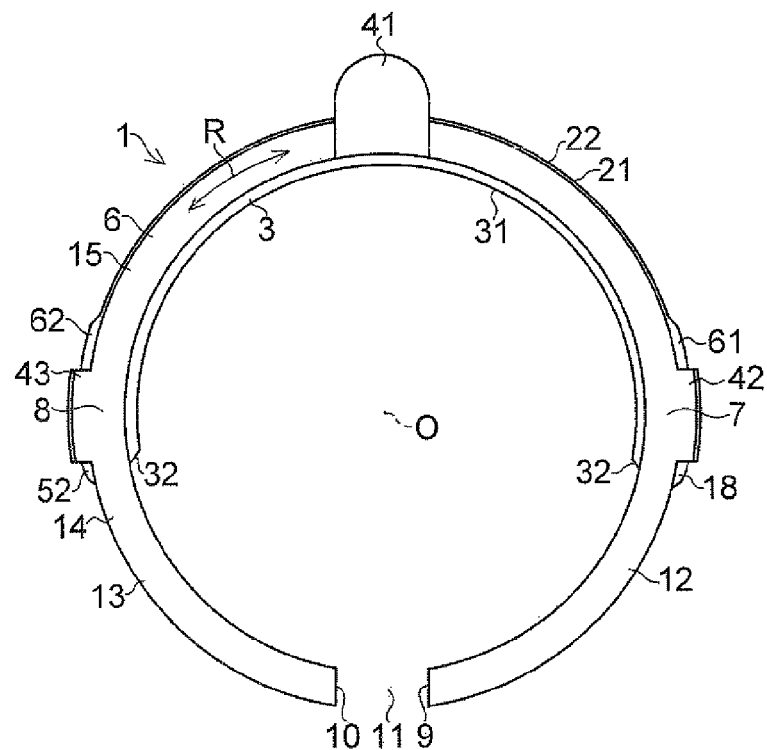
FIG. 3 is an explanatory view, taken in the direction of arrows along line III-III, of the embodiment shown in FIG. 1.
Figure 4:
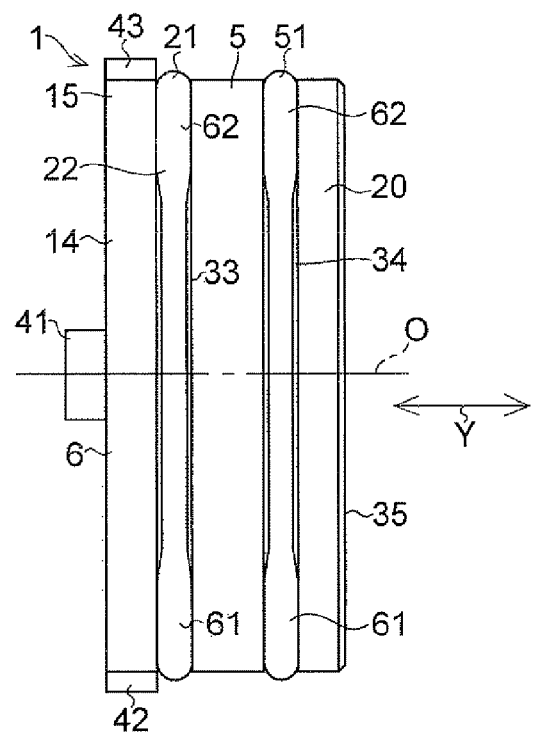
FIG. 4 is an explanatory view, taken in the direction of arrows along line IV-IV, of the embodiment shown in FIG. 1.
Figure 5:
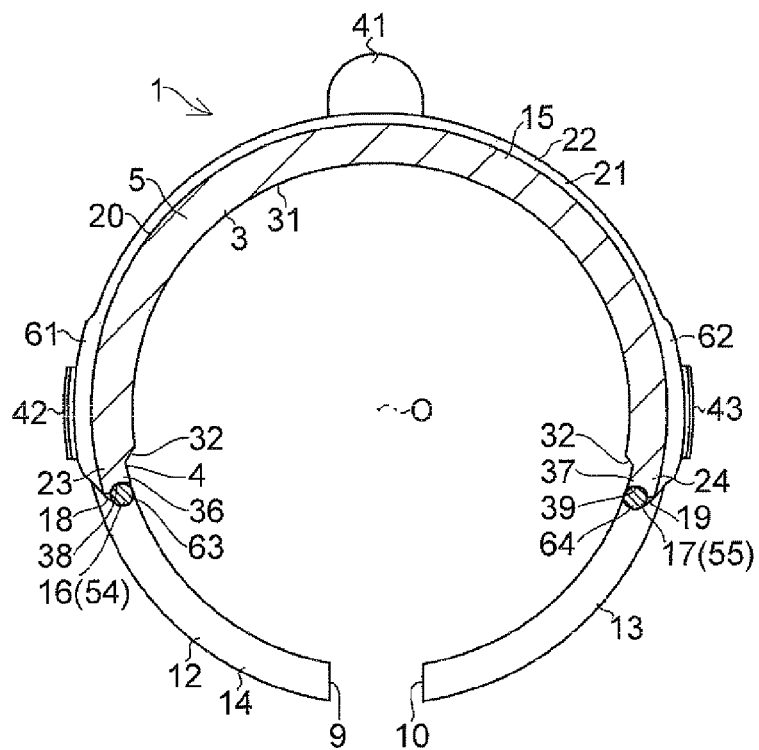
FIG. 5 is an explanatory cross-sectional view, taken in the direction of arrows along line V-V, of the embodiment shown in FIG. 1.
Figure 6:
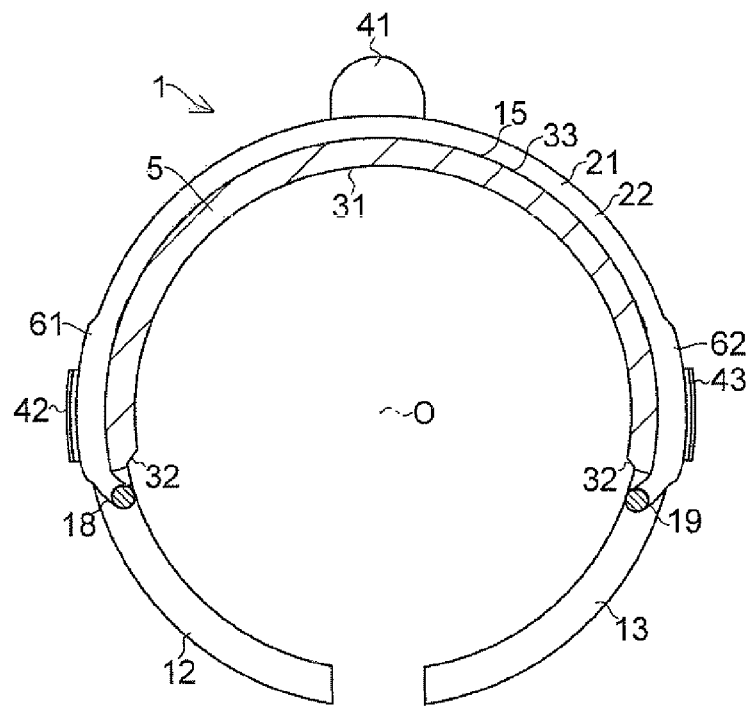
FIG. 6 is an explanatory cross-sectional view, taken in the direction of arrows along line VI-VI, of the embodiment shown in FIG. 1.
Figure 7:
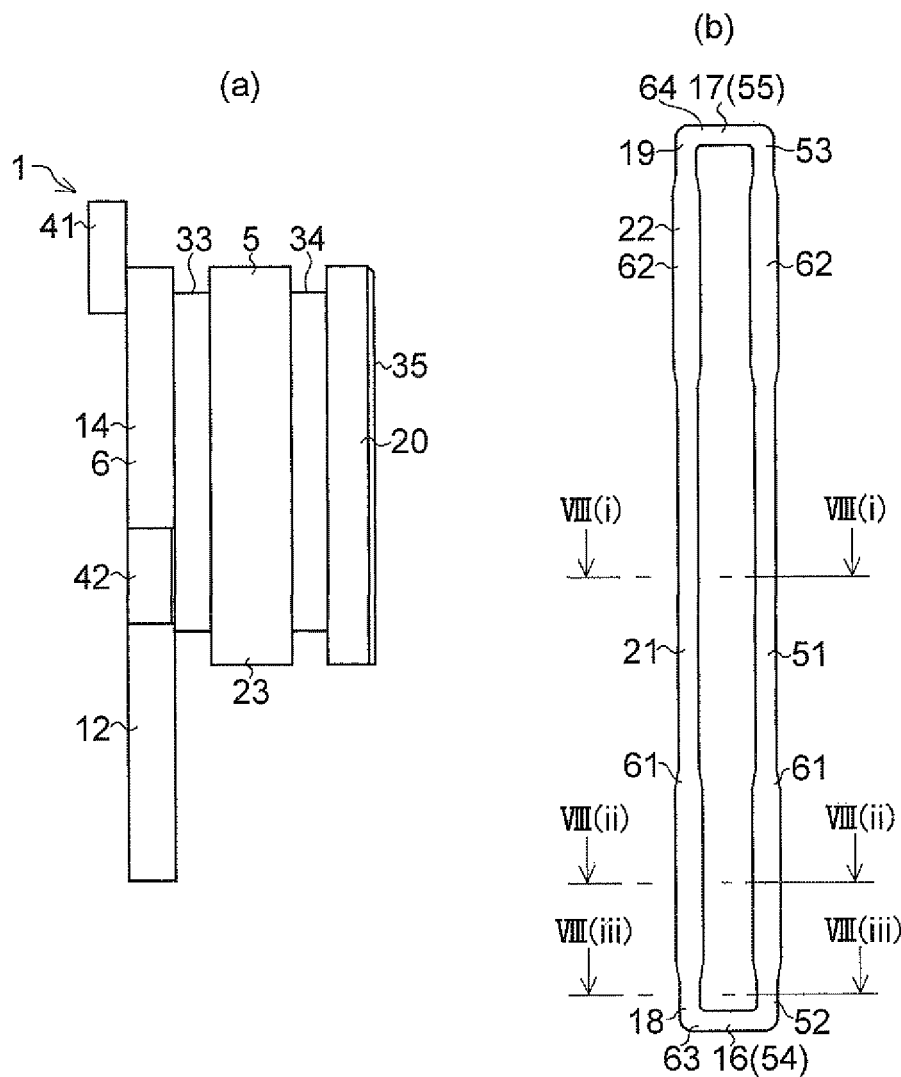
Figure 8:
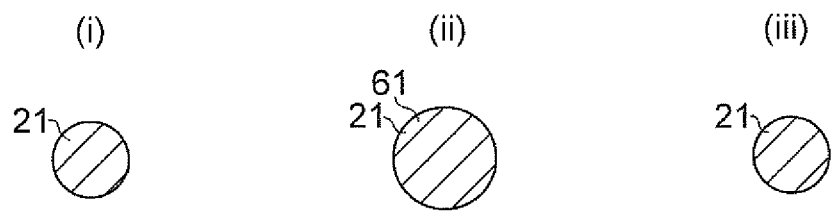
Figure 9:
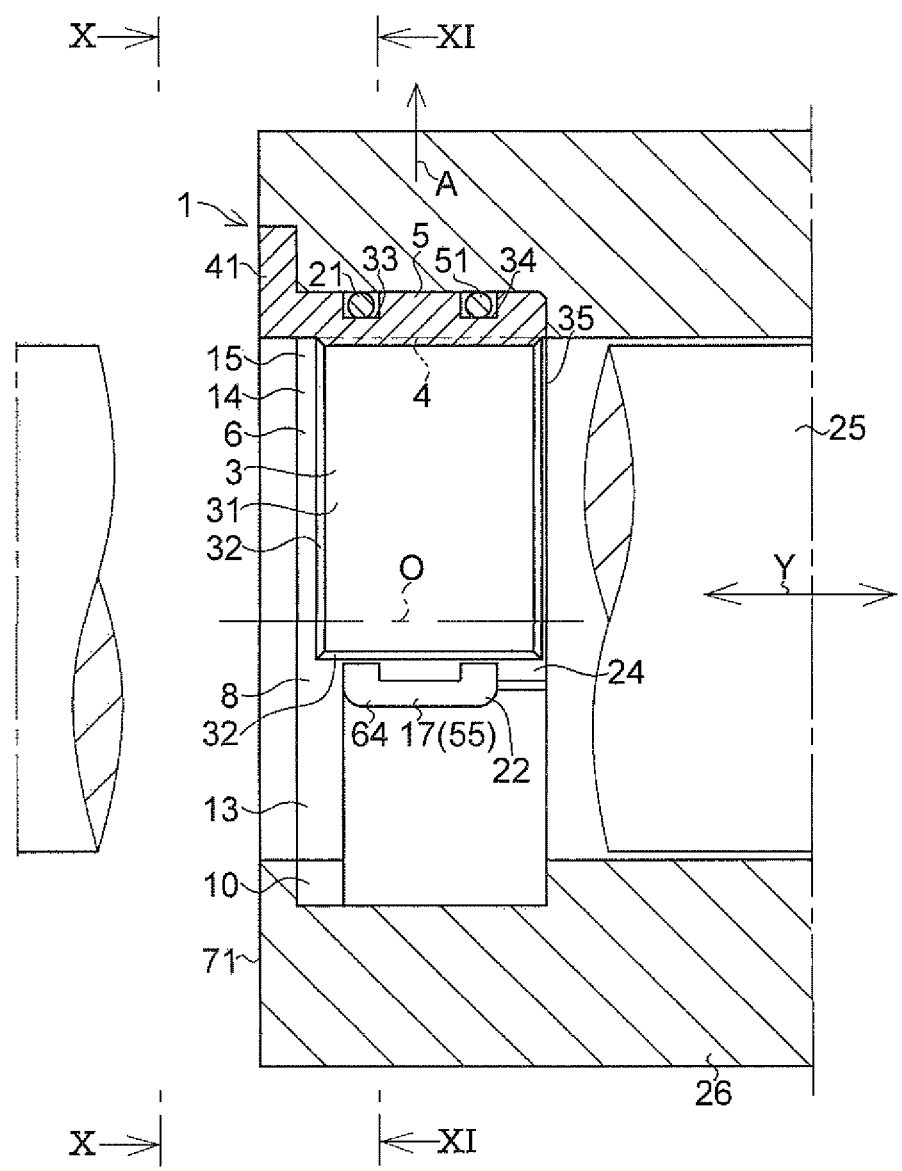
Figure 10:
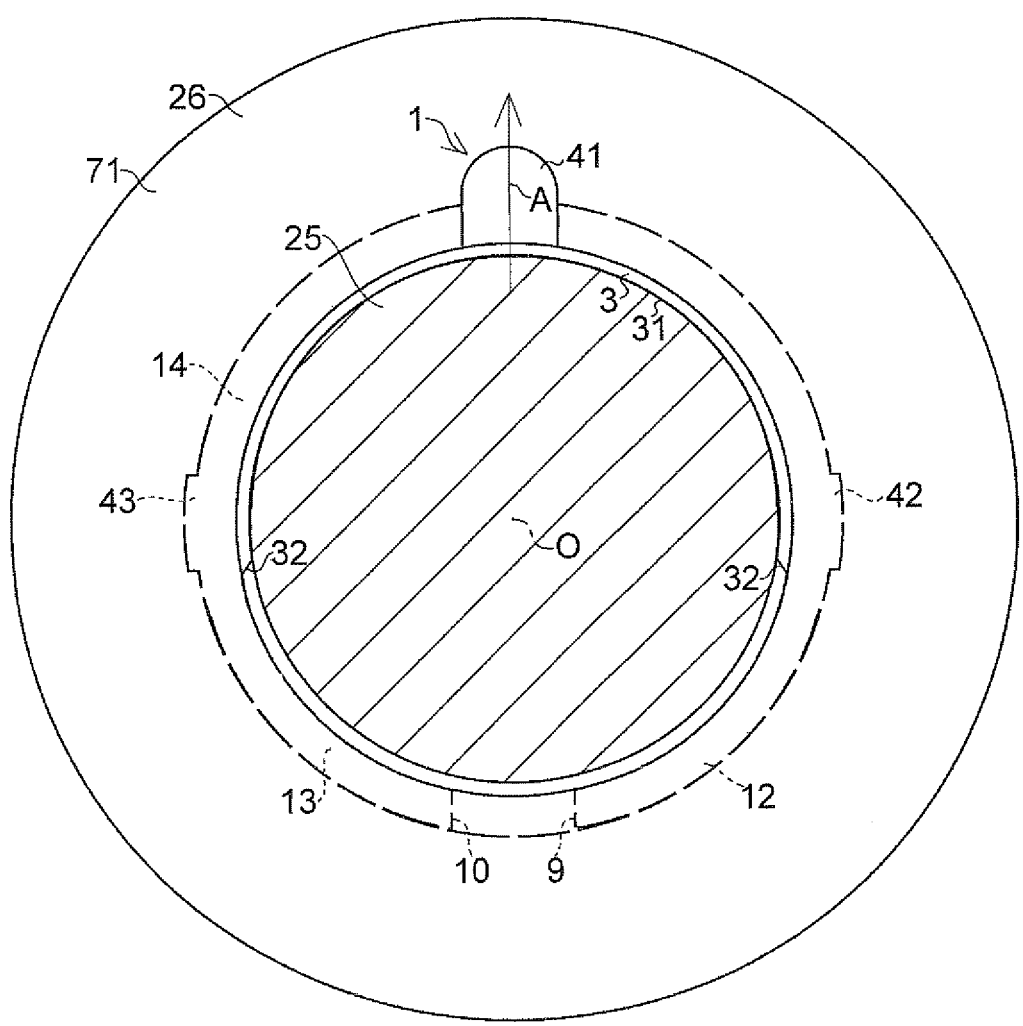
Figure 11:
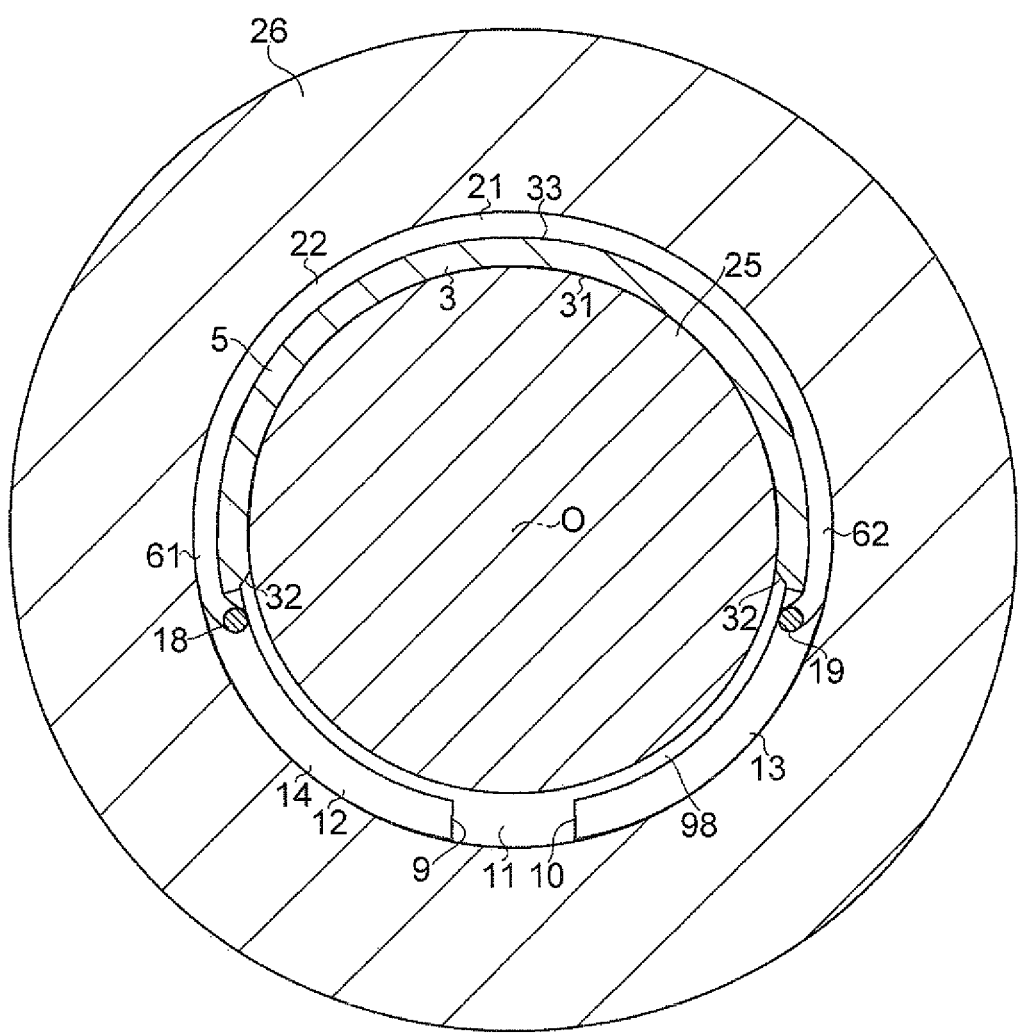
Figure 12:
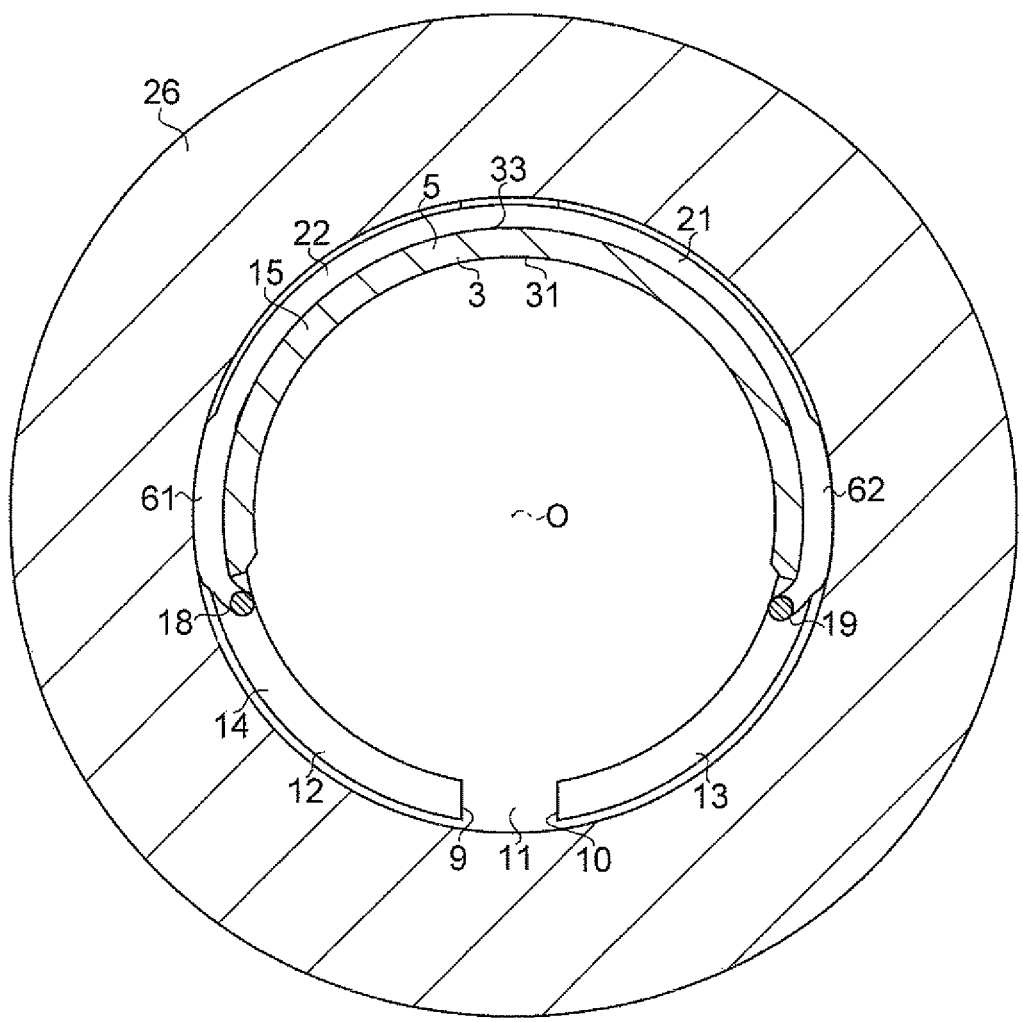
Figure 13:
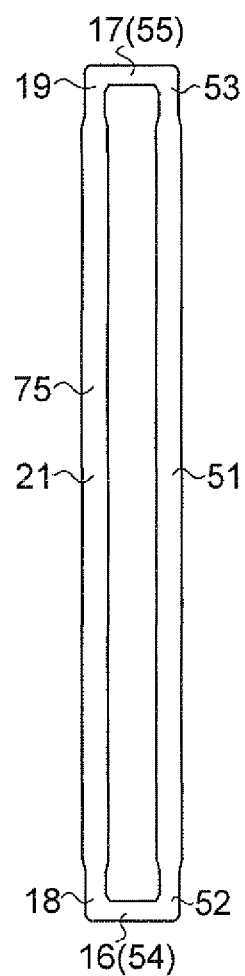
Figure 14:
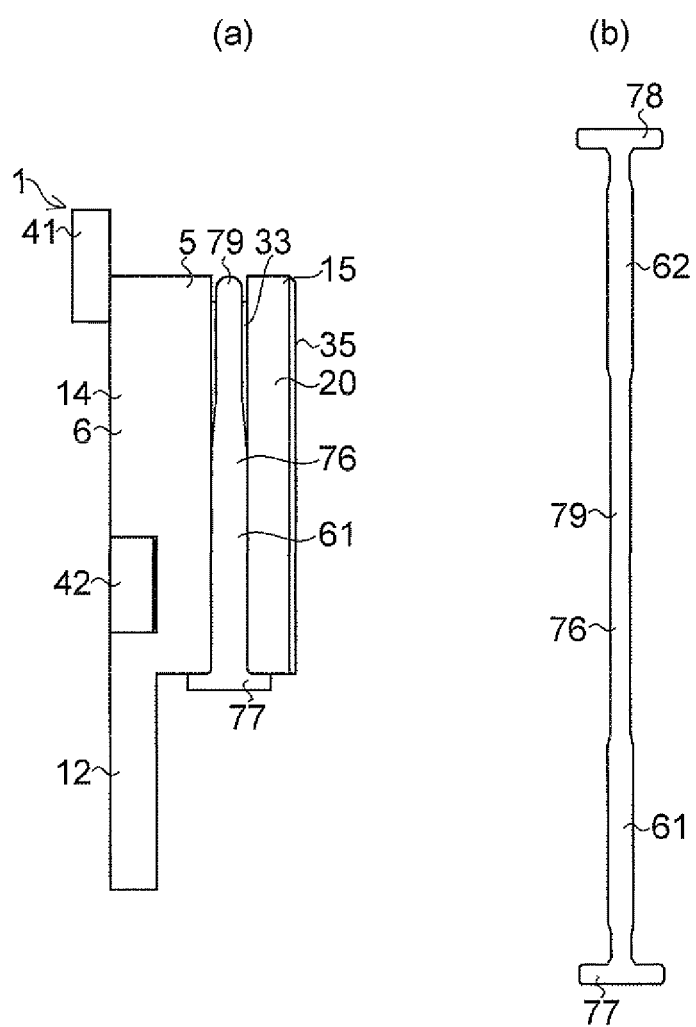
Figure 15:
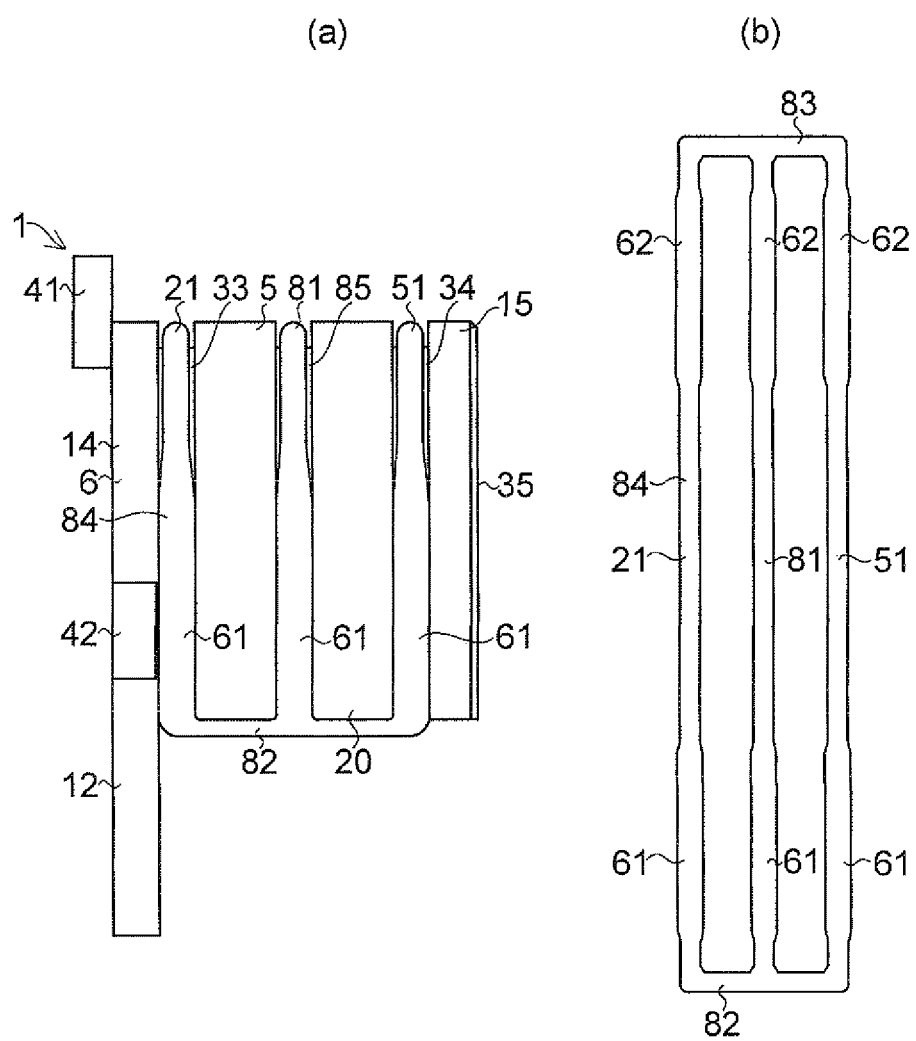
Figure 16:
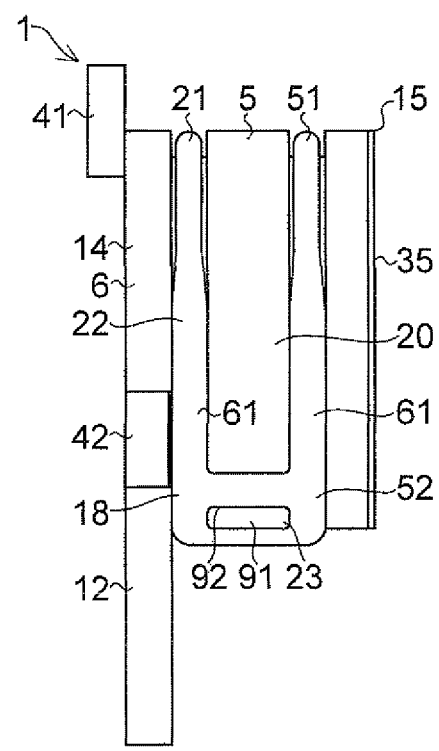
Figure 17:
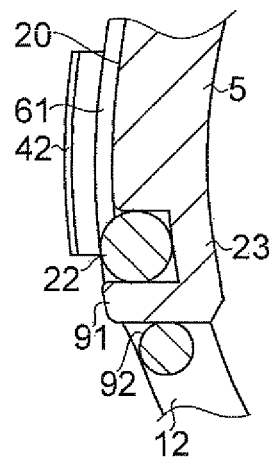
Figure 18:
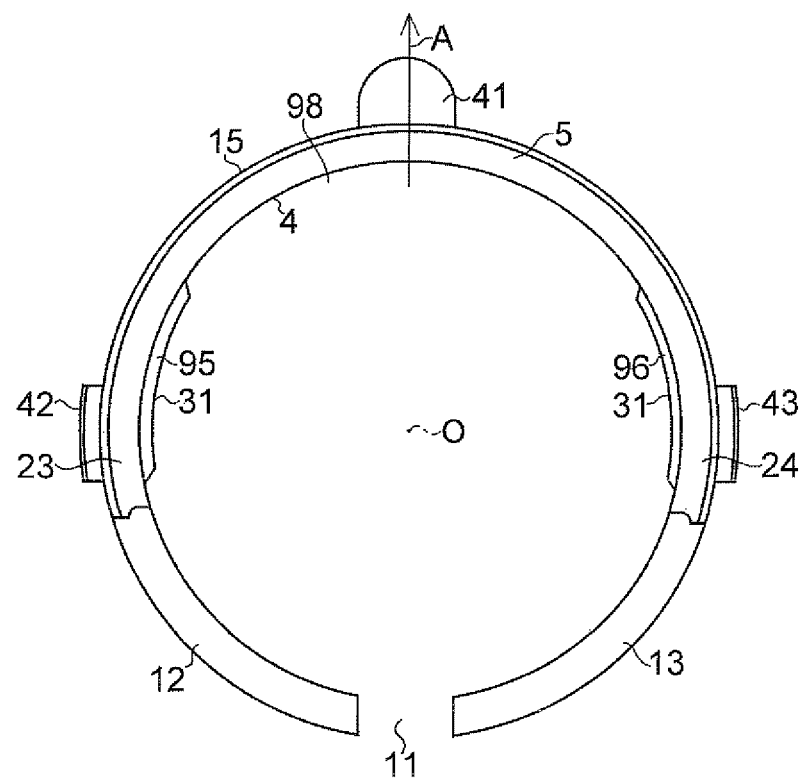

Part (a) of FIG. 7 is an explanatory side elevational view of a bush of the embodiment shown in FIG. 1, and part (b) thereof is an explanatory view of an elastic member of the embodiment shown in FIG. 1;

Part (i) of FIG. 8 is an explanatory cross-sectional view, taken in the direction of arrows along line VIII(i)-VIII(i), of the embodiment shown in the part (b) of FIG. 7, part (ii) of FIG. 8 is an explanatory cross-sectional view, taken in the direction of arrows along line VIII(ii)-VIII(ii), of the embodiment shown in the part (b) of FIG. 7, and part (iii) of FIG. 8 is an explanatory cross-sectional view, taken in the direction of arrows along line VIII(iii)-VIII(iii), of the embodiment shown in the part (b) of FIG. 7;

FIG. 9 is a diagram explaining the fitting of the embodiment shown in FIG. 1;

FIG. 10 is an explanatory view, taken in the direction of arrows along line X-X, of the embodiment shown in FIG. 9;

FIG. 11 is an explanatory cross-sectional view, taken in the direction of arrows along line XI-XI, of the embodiment shown in FIG. 9;

FIG. 12 is an explanatory diagram at the time of the withdrawal of a rack shaft of the embodiment shown in FIG. 11;

FIG. 13 is an explanatory diagram concerning primarily another elastic member of the embodiment shown in FIG. 1;

Part (a) of FIG. 14 is an explanatory side elevational view of another embodiment of the invention, and part (b) is an explanatory diagram of the elastic member of the embodiment in the part (a);

Part (a) of FIG. 15 is an explanatory side elevational view of still another embodiment of the invention, and part (b) is an explanatory diagram of the elastic member of the embodiment in the part (a);

FIG. 16 is an explanatory side elevational view of a further embodiment of the invention;

FIG. 17 is a partially enlarged explanatory cross-sectional view of the embodiment shown in FIG. 16; and FIG. 18 is an explanatory diagram of a still further embodiment of the invention.

BEST MODE FOR CARRYING OUT THE INVENTION

Hereafter, a more detailed description will be given of the present invention with reference to the preferred embodiments shown in the drawings. It should be noted that the present invention is not limited to these embodiments.

In FIGS. 1 to 8, a bush bearing 1 in accordance with this embodiment is comprised of: a synthetic resin-made bush 15 including a flexible semi-split cylindrical body 5 which is disposed on the side of a rack shaft-pinion gear spacing-apart direction A, and which has on its inner surface 4 an abutment portion 3 for slidably abutting against a rack shaft 25 shown in FIGS. 9 to 11, and including a flexible open-ended annular body 14 which has a portion 6 formed integrally at one end face in an axial direction Y of the semi-split cylindrical body 5 and has a pair of circular arc-shaped extended portions 12 and 13 which extend in a circumferential direction R from both end portions 7 and 8 in the circumferential direction R of the portion 6 and whose respective distal ends 9 and 10 are opposed to each other with a clearance 11 in the circumferential direction R; and an elastic member 22 including an elongated elastic body 21 which has retained portions 16 and 17 formed integrally at its both end portions 18 and 19 and abuts against an outer surface 20 of the semi-split cylindrical body 5, the retained portions 16 and 17 being respectively retained by both end portions 23 and 24 in the circumferential direction R of the semi-split cylindrical body 5.

In FIGS. 9 to 11, reference numeral 25 denotes a rack shaft of a rack-and-pinion type steering apparatus for an automobile, and reference numeral 26 denotes a housing of the rack-and-pinion type steering apparatus for an automobile. The rack shaft 25 has rack teeth (not shown) meshing with the teeth of a pinion gear (not shown), and is guided and moved in a predetermined direction, i.e., the same direction as the axial direction Y, by a rack guide (not shown). The rack shaft 25 is passed through the housing 26. The swinging direction of the rack shaft 25 is a direction intersecting the axial direction Y. Reference character A denotes a direction in which the rack shaft and the pinion gear are spaced apart from each other, which direction intersects the axial direction Y. The bush bearing 1 is fitted in the housing 26, restricts the swinging motion of the rack shaft 25, particularly the swinging motion of the rack shaft 25 on the side of the rack shaft-pinion gear spacing-apart direction A, and supports the rack shaft 25 movably in the axial direction Y.

The outer surface 20 and the inner surface 4 of the synthetic resin-made semi-split cylindrical body 5 are shaped in the form of circular arcs having as their center an axis O extending in the axial direction Y. Both end edges in the circumferential direction R of the outer surface 20 project in the circumferential direction R with respect to both end edges in the circumferential direction R of the inner surface 4. A retaining portion 36 for retaining the retained portions 16 and 54 is formed at the end portion 18, while a retaining portion 37 for retaining the retained portions 17 and 55 is formed at the end portion 19.

The abutment portion 3 is formed over the entire region or the substantially entire region of the inner surface 4. An abutment surface 31 of the abutment portion 3 which slidably abuts against the rack shaft 25 has a circular arc shape about the axis O of the bush 15.

A peripheral edge 32 of the abutment portion 3 surrounding the abutment surface 31 is tapered. Cross-sectionally rectangular recessed grooves 33 and 34, which extend in the circumferential direction R and to which the elastic bodies 21 and 51 are fitted, are formed in the outer surface 20. The recessed groove 33 is adjacent to the portion 6, while the recessed groove 34 is disposed at an equal interval to the width in the axial direction Y of the portion 6 with respect to the other end face 35 in the axial direction Y of the semi-split cylindrical body 5. The recessed grooves 33 and 34 have mutually identical shapes.

The retaining portions 36 and 37 are formed between the recessed grooves 33 and 34. The retaining portion 36 has a retaining surface 38 for retaining the retained portions 16 and 54 by abutting against the retained portions 16 and 54. Such a retaining surface 38 is inclined from an end edge of the inner surface 4 on the end portion 18 side toward an end edge of the outer surface 20 on the end portion 18 side, and has a shape complementary to the retained portions 16 and 54, i.e., a recessed curved shape in this embodiment. The retaining portion 37 is constituted by a retaining surface 39 for retaining the retained portions 17 and 55 by abutting against the retained portions 17 and 55. Such a retaining surface 39 is inclined from an end edge of the inner surface 4 on the end portion 19 side toward an end edge of the outer surface 20 on the end portion 19 side, and has a shape complementary to the retained portions 17 and 55, i.e., a recessed curved shape in this embodiment.

The synthetic resin-made open-ended annular body 14 is integrally formed with the semi-split cylindrical body 5. The portion 6 has an identical shape to that of one end face in the axial direction Y of the semi-split cylindrical body 5. The outer surface of the portion 6 is formed with the same shape as the outer surface 20, and the inner surface of the portion 6 is formed with the same shape as the inner surface 4. The extended portions 12 and 13 have a circular arc shape about the axis O and have the same radius of curvature as the portion 6. The lengths of the extended portions 12 and 13 in the circumferential direction R are mutually equal.

Projections 41, 42, and 43 for inhibiting the rotation of the bush 15 in the circumferential direction R with respect to the housing 26 in which the bush 15 is fitted are formed on an outer peripheral portion of the bush 15. The projection 41 is formed in a central portion in the circumferential direction R of the portion 6, and the projections 42 and 43 are formed at the both end portions 7 and 8 of the portion 6. Respective ones of the projections 41, 42, and 43 project from the open-ended annular body 14 in radial directions having the axis O as their center.

The elastic member 22 is preferably formed of natural rubber or synthetic rubber, but may be formed of an elastic thermoplastic synthetic resin, e.g., a polyester elastomer.

The elastic member 22 in this embodiment further has another elastic body 51 juxtaposed to the elastic body 21 and the retained portions 54 and 55 which are respectively formed integrally with its both end portions 52 and 53. Each of the retained portions 16 and 17 is connected to each of the retained portions 54 and 55. The elastic member 22 in this embodiment has the two elastic bodies (elastic bodies 21 and 51).

Since the elastic bodies 21 and 51 are formed in a mutually similar manner, so that a detailed description will be given hereafter of the elastic body 21. As for the elastic body 51, the same reference numerals will be appended in the drawings, as required, and a detailed description thereof will be omitted.

The elastic body 21 in terms of its cross section may have a circular shape, an elliptical shape, a rectangular shape, a trapezoidal shape, a flattened oval shape, an X shape, a U shape, or the like. In this embodiment, however, the elastic body 21 has a circular shape, as shown in the parts (i) to (iii) of FIG. 8. As shown in the part (b) of FIG. 7, the elastic body 21 has enlarged-diameter portions 61 and 62 located in the respective vicinities of the retained portions 16 and 17. The enlarged-diameter portions 61 and 62 have mutually identical diameters. The diameter of the enlarged-diameter portion 61 shown in the part (ii) of FIG. 8 is larger than the diameter of the portion, shown in the part (iii) of FIG. 8, of the elastic body 21 located on the retained portion 16 side with respect to that enlarged-diameter portion 61 and the diameter of the portion, shown in the part (i) of FIG. 8, of the elastic body 21 located on the retained portion 17 side with respect to that enlarged-diameter portion 61. It should be noted that the diameters of the portions shown in the parts (i) and (iii) of FIG. 8 are mutually equal.

The retained portion 16 is constituted by a cross-sectionally circular protruding portion 63 protruding in a direction intersecting, or in this embodiment perpendicular to, the longitudinal direction of the elastic body 21. The retained portion 17 is constituted by a cross-sectionally circular protruding portion 64 protruding in a direction intersecting, or in this embodiment perpendicular to, the longitudinal direction of the elastic body 21. Such protruding portions 63 and 64 protrude toward the elastic body 51 side. It should be noted that the both end portions 52 and 53 of the elastic body 51 are respectively connected integrally to leading ends of the protruding portions 63 and 64. The respective ones of the protruding portions 63 and 64 also constitute the retained portions 54 and 55 formed by the protruding portions protruding toward the elastic body 21 side. In other words, the retained portion 54 is constituted by a portion common to the retained portion 16 of the elastic member 22, and the retained portion 55 is constituted by a portion common to the retained portion 17 of the elastic member 22.

Such an elastic member 22 is mounted to the bush 15 as the elastic body 21 is fitted to the recessed groove 33, the elastic body 51 is fitted to the recessed groove 34, the retained portions 16 and 54 are retained by the retaining portion 36, and the retained portions 17 and 55 are retained by the retaining portion 37, respectively. The respective ones of the enlarged-diameter portions 61 and 62 of the elastic bodies 21 and 51 mounted to the bush 15 project from the recessed grooves 33 and 34, and are thus adapted to be pressed by the housing 26 when the bush bearing 1 is fitted in the housing 26, which pressing is adapted to elastically press the bush 15 toward the axis O side on the basis of the elastic force of these enlarged-diameter portions 61 and 62. Since that bush 15 has flexibility, the portions of the bush 15 elastically pressed by the enlarged-diameter portions 61 and 62 undergo slight displacement toward the axis O side to thereby form interferences of the semi-split cylindrical body 5 with respect to the rack shaft 25. It should be noted that portions of the elastic bodies 21 and 51 excluding the enlarged-diameter portions 61 and 62 may also have diameters of such a measure as to protrude from the respective ones of the recessed grooves 33 and 34.

As shown in FIGS. 9 to 11, the above-described bush bearing 1 is fitted in the housing 26 and slidably abuts at its abutment surface 31 against the outer peripheral surface of the rack shaft 25 passed through the housing 26. Since the semi-split cylindrical body 5 is interposed between the housing 26 and the rack shaft 25, the elastic bodies 21 and 51 of the bush bearing 1 in such a state are accommodated in the recessed grooves 33 and 34 while undergoing restorable elastic deformation. The bush bearing 1 is fitted into the housing 26 from an end face 71 side of the housing 26 while the flexible bush 15 is being restorably deflected. Since interferences are formed in the bush 15 by the elasticity of the elastic member 22, the rack shaft 25 supported by such a bush bearing 1 is supported smoothly slidably in the axial direction Y with an appropriate sliding load. The sliding load can be appropriately adjusted by changing the diameter, hardness, and the like of the elastic member 22. The semi-split cylindrical body 5 is disposed on the side of the rack shaft-pinion gear spacing-apart direction A by being fitted in the housing 26. In a case where the rack shaft 25 is withdrawn from the housing 26, the bush 15 undergoes slight displacement toward the axis O side on the basis of the elastic force of the elastic member 22, particularly the enlarged-diameter portions 61 and 62, as shown in FIG. 12. When the rack shaft 25 is inserted in the bush bearing 1 fitted in the housing 26, the bush 15 is extended by the rack shaft 25, as shown in FIG. 11. Such a bush bearing 1 elastically restricts the random swinging motion of the rack shaft 25, particularly its swinging motion on the side of the rack shaft-pinion gear spacing-apart direction A, to thereby prevent a large increase in the frictional resistance force of the rack shaft 25 with respect to the rack guide. In addition, since the bush bearing 1 slidably abuts at its abutment surface 31 against only one circumferential portion of the outer peripheral surface of the rack shaft 25, it is possible to decrease the frictional resistance force of the rack shaft 25 with respect to the bush bearing 1 as compared with cases where the rack shaft 25 is supported by, for instance, an endless cylindrical bush bearing or the like.

According to the bush bearing 1 in accordance with this embodiment, the bush bearing 1 is comprised of the synthetic resin-made bush 15 including the flexible semi-split cylindrical body 5 which is disposed on the side of the rack shaft-pinion gear spacing-apart direction A, and which has on its inner surface 4 the abutment portion 3 for abutting against the rack shaft 25 slidably in the axial direction Y, and including the flexible open-ended annular body 14 which has the portion 6 formed integrally at one end face in the axial direction Y of the semi-split cylindrical body 5 and has the pair of extended portions 12 and 13 which extend from the both end portions 7 and 8 in the circumferential direction R of that portion 6 and whose respective distal ends 9 and 10 are opposed to each other with the clearance 11 in the circumferential direction R; and the elastic member 22 including the elongated elastic body 21 (51) which has the retained portions 16 (54) and 17 (55) formed integrally at its both end portions 18 (52) and 19 (53), respectively, and abuts against the outer surface 20 of the semi-split cylindrical body 5, the retained portions 16 (54) and 17 (55) being respectively retained by the both end portions 23 and 24 in the circumferential direction R of the semi-split cylindrical body 5. Therefore, in the case where the bush bearing 1 is fitted in the housing 26, interferences of the semi-split cylindrical body 5 with respect to the rack shaft 25 are formed on the basis of the elasticity of the elastic member 22 which is pressed by the housing 26, thereby making it possible to allow the portion of the rack shaft 25 on the side of the rack shaft-pinion gear spacing-apart direction A to be smoothly and slidably supported by the abutment portion 3 of the semi-split cylindrical body 5. Hence, it is possible to smoothly move the rack shaft 25 in a predetermined direction without causing a large increase in the frictional resistance force of the rack shaft 25 with respect to the rack guide due to the random swinging motion of the rack shaft 25, thereby making it possible to prevent a decline in the steering feel of the rack-and-pinion type steering apparatus. In addition, according to the bush bearing 1, particularly since the bush 15 has the semi-split cylindrical body 5 and the open-ended annular body 14, it is possible to effect manufacture with less material and attain a reduction in the manufacturing cost as compared to, for instance, the bush bearing having a cylindrical bush in Patent Document 1.

According to the bush bearing 1, the elastic member 22 has the other elastic body 51 juxtaposed to the elastic body 21 and the retained portions 54 and 55 which are respectively formed at its both end portions 52 and 53. Since each of the retained portions 16 and 17 formed at the both end portions 18 and 19 of the elastic body 21 is connected to each of the retained portions 54 and 55 formed at the both end portions 52 and 53 of the elastic body 51, the rack shaft 25 can be suitably supported slidably by the abutment portion 3 of the semi-split cylindrical body 5.

According to the bush bearing 1, since the elastic body 21 (51) has enlarged-diameter portions 61 and 62 located in the respective vicinities of the retained portions 16 (54) and 17 (55), it is possible to form interferences at the both end portions 23 and 24 and their vicinities in the circumferential direction R of the semi-split cylindrical body 5. Hence, it is possible to support the rack shaft 25 in the axial direction Y and in a direction intersecting the rack shaft-pinion gear spacing-apart direction A. In addition, even in cases where the rack teeth of the rack shaft 25 and the teeth of the pinion gear are formed by helical gears, it is possible to suitably restrict the swinging motion of the rack shaft 25, thereby making it possible to prevent an increase in the frictional resistance force between the rack shaft 25 and the semi-split cylindrical body 5.

According to the bush bearing 1, since the projections 41, 42, and 43 for inhibiting the rotation of the bush 15 with respect to the housing 26 in which the bush 15 is fitted are formed on the outer peripheral surface of the bush 15, as these projections 41, 42, and 43 are fitted in the corresponding recessed portions of the housing 26, it is possible to easily effect the positioning of the bush bearing 1 with respect to the housing 26 and the rack shaft 25.

The bush bearing 1 may be provided with, instead of the elastic member 22, an elastic member 75 shown in FIG. 13. The diameter of the elastic member 75 is identical from its one end portion to its other end portion. Such an elastic member 75 may be formed by such as an O-ring, for example.

The bush bearing 1 may be provided with, instead of the elastic member 22, an elastic member 79 having one elastic body 76 and retained portions 77 and 78 shown in the part (b) of FIG. 14. Such retained portions 77 and 78 are constituted by protruding portions extending in the axial direction Y perpendicular to the longitudinal direction of the elastic body 76. In the case where such an elastic member 79 is provided, as for the bush 15, the recessed groove 34 may be omitted, and the recessed groove 33 may be disposed in a central portion in the axial direction Y of the semi-split cylindrical body 5, as shown in the part (a) of FIG. 14. Still alternatively, the bush bearing 1 may be provided with, instead of the elastic member 22, an elastic member 84 having three elastic bodies 21, 51, and 81 and common retained portions 82 and 83 formed at their both end portions, as shown in the part (b) of FIG. 15. In the case where such an elastic member 84 is provided, the bush 15 may have three recessed grooves 33, 34, and 85 to which the elastic bodies 21, 51, and 81 are fitted, as shown in the part (a) of FIG. 15.

The semi-split cylindrical body 5 may be provided with, instead of the retaining portion 36, a retaining portion constituted by a fitting protruding portion 91 which is formed at the end portion 23 in the circumferential direction R of the semi-split cylindrical body 5, as shown in FIGS. 16 and 17. In such a case, the elastic member 22 may be provided with, instead of the retained portion 16 (54), a retained portion constituted by a fitting recessed portion 92 which is fitted to the fitting protruding portion 91. Since such an elastic member 22 is mounted to the bush 15 through the fitting between the fitting protruding portion 91 and the fitting recessed portion 92, the elastic member 22 can be mounted to the semi-split cylindrical body 5 more reliably, and particularly when the bush bearing 1 is fitted in the housing 26, it is possible to more reliably eliminate the possibility of the elastic member 22 coming off the semi-split cylindrical body 5. The fitting between the fitting protruding portion 91 and the fitting recessed portion 92 may be effected by the so-called snap fitting method by providing a hook at a distal end of the fitting protruding portion. Still alternatively, the semi-split cylindrical body 5 may be provided with, instead of the retaining portion 37 and the retained portion 17 (55), a retaining portion and a retained portion constituted by a fitting protruding portion and a fitting recessed portion which are formed in the same way as the aforementioned fitting protruding portion 91 and fitting recessed portion 92.

The bush 15 may be provided with, instead of the abutment portion 3, a plurality of abutment portions 95 and 96 which are formed on the inner surface 4 of the semi-split cylindrical body 5, as shown in FIG. 18. In such a case, it is possible to partially form a clearance between the semi-split cylindrical body 5 and the rack shaft 25. For example, as a clearance 98 is formed between the semi-split cylindrical body 5 and the rack shaft 25 in the rack shaft-pinion gear spacing-apart direction A, it is possible to prevent an increase in the frictional resistance force between the semi-split cylindrical body 5 and the rack shaft 25 based on the random swinging motion of the rack shaft 25, particularly its swinging motion in the rack shaft-pinion gear spacing-apart direction A, thereby allowing the rack shaft 25 to slide more smoothly in the axial direction Y. In the bush 15 shown in FIG. 18, the abutment portion 95 which abuts against the rack shaft 25 is disposed on the end portion 23 side, while the abutment portion 96 which abuts against the rack shaft 25 is disposed on the end portion 24 side. In the case where such a bush 15 and the elastic member 22 are combined, it is preferred that the enlarged-diameter portion 61 be disposed on the outer side of the abutment portion 95, and the enlarged-diameter portion 62 be disposed on the outer side of the abutment portion 96.

In the bush bearing 1, one or a plurality of slits extending in the axial direction Y may be formed in substitution of the bush 15.

The invention claimed is:

1. A bush bearing comprising: a synthetic resin-made bush including a flexible semi-split cylindrical body having on an inner surface thereof an abutment portion for slidably abutting against a rack shaft, and including a flexible open-ended annular body which has a first semi annular portion formed integrally on one end face of said semi-split cylindrical body in an axial direction of said semi-split cylindrical body and a pair of extended portions which extend from both end portions of said first semi annular portion in a circumferential direction of said flexible open-ended annular body, respectively, and whose respective distal ends are opposed to each other with a clearance in the circumferential direction; and an elastic member including first elongated semi cylindrical elastic body and first and second retained portions, said first elongated semi cylindrical elastic body having terminated portions in both end thereof in said circumferential direction, respectively, said first and second retained portions being formed on said terminated portions and extending in said axial direction, respectively, said first elongated semi cylindrical elastic body abutting against an outer surface of said semi-split cylindrical body, the first and second retained portions being respectively retained by both end portions of said semi-split cylindrical body in the circumferential direction.

2. The bush bearing according to claim 1, wherein said elastic member has second elongated semi cylindrical elastic body juxtaposed to said first elongated semi cylindrical elastic body and third and fourth retained portions which are respectively formed at both end portions of said second elongated semi cylindrical, and each of the first and second retained portions formed at the both end portions of said first elongated semi cylindrical elastic body is connected to each of the third and fourth retained portions formed at the both end portions of said second elongated semi cylindrical elastic body.

3. The bush bearing according to claim 1, wherein said first elongated semi cylindrical elastic body has enlarged-diameter portions located in respective vicinities of the retained portions.

4. The bush bearing according to claim 1, wherein a fitting protruding portion is formed at each of the both end portions in the circumferential direction of said semi-split cylindrical body, a fitting recessed portion which is fitted to the fitting protruding portion is formed at the retained portion, and said elastic member is adapted to be mounted to said bush through the fitting between the fitting protruding portion and the fitting recessed portion.

5. The bush bearing according to claim 1, wherein a plurality of abutment portions are formed on the inner surface of said semi-split cylindrical body.

6. The bush bearing according to claim 1, said bush bearing is adapted to be fitted in a housing and comprises a projection for inhibiting the rotation of said bush with respect to said housing in which said bush is to be fitted is formed on an outer peripheral portion of said bush.

7. A rack-and-pinion type steering apparatus for an automobile, comprising: the bush bearing according to claim 1; a housing in which said bush bearing is fitted; a pinion gear; a rack shaft which has rack teeth meshing with teeth of said pinion gear; and a rack guide for guiding a movement of said rack shaft, said rack shaft is passed through said housing and being movably supported by the housing through the bush bearing.

8. The bush bearing according to claim 1, wherein the abutment portion is dimensioned to slidingly abut only a limited circumferential portion of the outer surface of the rack shaft.

9. The bush bearing according to claim 8, wherein the abutment portion includes edges defining the extent that the abutment portion slidingly engages the outer surface of the rack shaft, wherein a circumferential distance between the ends is greater than the clearance between the distal ends.

\* \* \* \* \*